Oct. 25, 1966  H. L. LATHAM, JR  3,280,630
COLD JUNCTION

Filed Nov. 2, 1964  2 Sheets-Sheet 1

INVENTOR.
Harry L. Latham, Jr.
BY
ATTORNEY

Oct. 25, 1966  H. L. LATHAM, JR  3,280,630
COLD JUNCTION

Filed Nov. 2, 1964  2 Sheets-Sheet 2

INVENTOR.
Harry L. Latham, Jr.
BY
Walter S. Zebrowski
ATTORNEY

United States Patent Office 3,280,630
Patented Oct. 25, 1966

3,280,630
COLD JUNCTION
Harry L. Latham, Jr., Bethayres, Pa., assignor, by mesne assignments, to Robertshaw Controls Company, Richmond, Va., a corporation of Delaware
Filed Nov. 2, 1964, Ser. No. 408,293
5 Claims. (Cl. 73—361)

This invention relates to temperture sensing and measuring systems and more particularly to an improved cold junction for a temperature measuring instrument.

Temperature sensing and measuring systems often depend upon the comparison of two voltages generated by two separate thermocouples.

One thermocouple is called a primary thermocouple or primary sensor and is placed in the unknown environment whose temperature is to be measured. The other thermocouple is called a reference thermocouple, a reference junction, a cold junction or the like, and is placed in a stable reference environment whose temperature is known. One such reference environment for example is an ice bath at 0° C.

Thermocouples are constructed of dissimilar metals such as chromel and alumel, iron and constantan, platinum and platinum with 10% rhodium, and the like.

It is well known that a thermocouple generates a tiny voltage and that the amount of voltage generated depends upon the temperature to which the thermocouple is exposed.

The voltage output of thermocouples with respect to temperature is not linear, therefore, for accurate and reproducible results, standard thermocouples are calibrated against primary reference standards whose voltage output is precisely known at certain temperatures. Such standard thermocouples are then certified and find wide use in laboratories, industrial processes and other places where accurate measurement of temperature is required.

One of the best thermocouples obtainable for reproducibility of voltage output with temperature, resistance to oxidization, high purity of metal and other advantages, is the platinum and platinum-10% rhodium thermocouple.

Other methods of measuring temperatures are available. One such method is by use of a resistance thermometer consisting of an element made from insulated wire such as nickel, platinum, copper or the like wound in a helix or coil and encased in a sealed metal tube. The resistance element so formed is connected to a measuring circuit.

Resistance thermometers afford great precision of temperature measurement below 660° C., and in less rugged and expensive forms, are widely used at temperatures up to 150° C.

Resistance thermometers depend upon change of resistance with temperature for their operation, which, in a circuit with current flowing through it, creates a voltage difference across the resistance element. Such a voltage difference or drop, can be measured and correlated to temperature.

Problems with prior art devices

In most temperature measuring applications, it is difficult and sometimes impossible to maintain a reference environment, such as an ice bath at 0° C., for the cold junction. Since the voltage produced by the reference junction is a standard for comparison with voltages produced by the primary sensor, it is mandatory for accuracy of measurement that the reference voltage be held constant. Removal of the reference thermocouple from its reference environment causes it to produce voltages other than the desired stable voltage, rendering accurate measurement of temperature impossible.

In prior art devices for temperature measurement, it has been difficult to provide reference junctions which are substantially unaffected by ambient temperatures.

Reference junctions easily adaptable for use with thermocouples of different materials have heretofore not been available.

It has been difficult to provide a stable reference junction operable at room temperature, because of the difficulty in maintaining all parts of the junction and its environment at the same temperature.

Accordingly, this invention deals with the problems encountered by prior art sensing and measuring devices, and is directed to an inexpensive, economical, and practical means for solving them.

An object of the present invention is to provide a cold junction suitable for replacing conventional cold junctions of prior art devices.

Another object of the present invention is to provide a cold junction which does not require an ice bath environment.

Still another object of the present invention is to provide a cold junction capable of stable operation in a varying environment.

A further object of the present invention is to provide a cold junction capable of stable operation at room temperature.

A still further object of the present invention is to provide a cold junction capable of maintaining excellent temperature uniformity throughout its structure.

Briefly, the present invention is a cold junction comprising a resistance element encased in a thermally conductive and electrically insulative block capable of being maintained at a uniform, although not necessarily constant, temperature throughout; said element and block being suitable for replacing a cold junction of conventional temperature measuring systems, and said element capable of providing compensation for wide variations of ambient temperature in which it and the block may be placed.

These together with other objects and advantages of the present invention, and the manner in which they are accomplished will be apparent from the following description and drawings in which.

Figure 1:
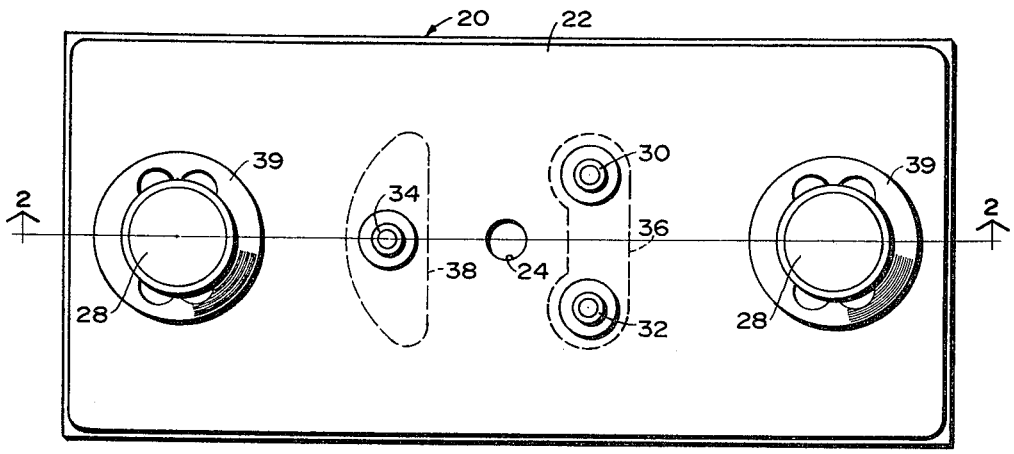
FIGURE 1 is a plan view of a cold junction, according to the present invention.

Referring now to the drawings, FIGURE 1 shows cold junction 20. Electrically insulative cover plate 22 is provided with holes 24 and 26 as additionally illustrated in FIGURE 2. Suitable materials for the cover plate are plastic, plastic impregnated glass fiber, and the like.

Holes 26 accommodate threaded conductive terminal posts 28. The posts may be made of electrically and thermally conductive metals such as copper, brass, gold plated brass and the like. Electrically conductive pins 30, 32, and 34 are embedded in plate 22. It will be noted that pins 30 and 32 are connected by means of pin support 36, and pin 34 is connected to pin support 38. Fasteners 39, which may be hex nuts, plate nuts, speed nuts and the like are threaded on posts 28.

Figure 2:
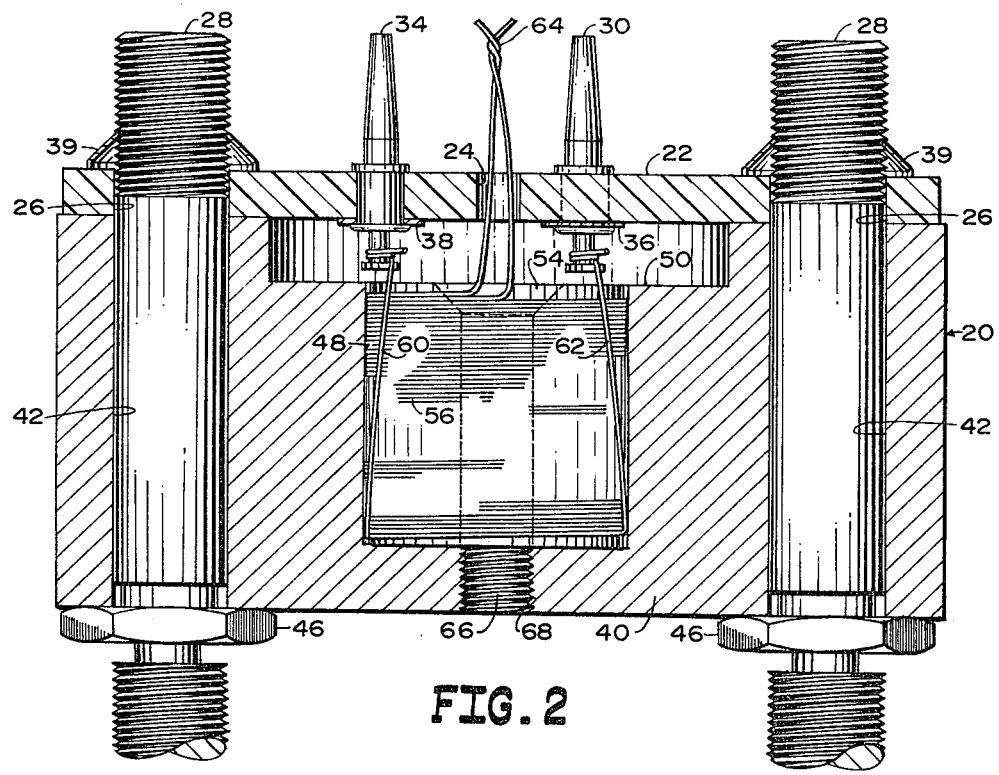
FIGURE 2 is a cross section view of a cold juntion taken along line 2—2 of FIGURE 1.

FIGURE 2 illustrates a thermally conductive but electrically insulative block 40 provided with holes 42 to accommodate terminal posts 28. The block may be made of metal such, for example, as enamelled copper, plastic coated brass, anodized aluminum and the like. Fasteners 39 cooperate with posts 28 and shoulder portions 46 thereof, to clamp cover plate 22 to block 40.

Cavity 48 in block 40 has a shoulder portion 50 and accommodates bobbin 54 and bifilarly wound wire resistance element 56. A first pair of end portions 60 and 62 of the resistance element are fastened to pins 30 and 34 in the cover plate.

A second pair of end portions 64 of the resistance element are inserted through hole 24 of the cover plate to be used during cold junction calibration as hereinafter described. Bobbin 54 is secured to block 40 within cavity 48 by means of bobbin fastener 66, threaded into hole 68 of the block. The resistance element may be made from electrically conductive wire such as brass, platinum, nickel, copper and the like. The bobbin may be made from metal such as platinum, nickel, copper brass and the like.

Figure 3:
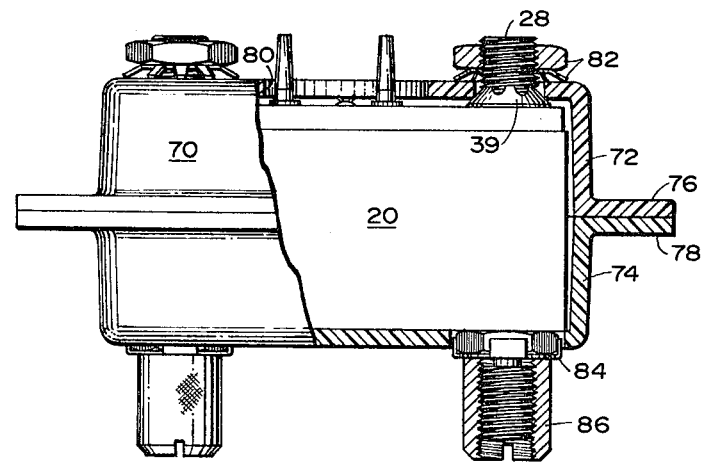
FIGURE 3 is an elevation view of an assembled cold junction showing its protective case.

FIGURE 3 illustrates cold junction 20 assembled within electrically and thermally insulative enclosure or case 70. Top portion 72 of the case fits over posts 28 of the cold junction and is secured thereto by means of fasteners 82. Bottom portion 74 of the case is placed over the cold junction and bonded to top portion 72 of the case by means of a suitable adhesive applied to the mating surfaces of flanges 76 and 78. A suitable hole 80 is provided in the top portion of the case to accommodate the pins of the cold junction so that external connections may be made thereto. Thermocouple lead fasteners 84 and 86 are placed on posts 28, completing the assembly. Suitable case materials are plastic, plastic impregnated glass fiber and the like.

Figure 4:
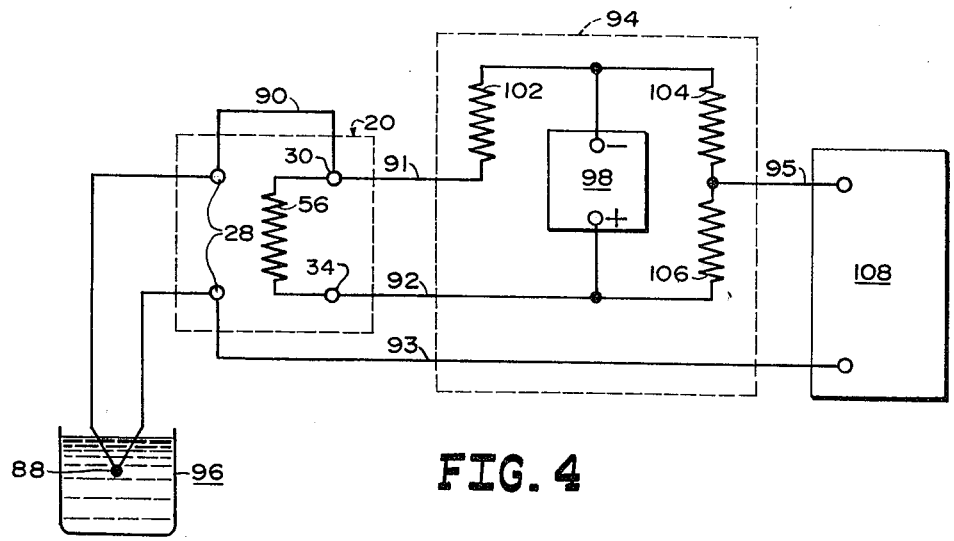
FIGURE 4 is a schematic diagram of a cold junction calibration circuit.

FIGURE 4 is a schematic diagram of a calibration circuit suitable for use in adjusting resistance element 56 during calibration of the cold junction. Thermocouple 88, eventually to be used as the primary thermocouple, is attached to posts 28 of cold junction 20. A suitable thermocouple may be made of iron-constantan, chromel-alumel, platinum, platinum-rhodium and the like. High conductivity and high purity leads 90, 91, 92, 93, and 95 are used to interconnect cold junction 20, bridge circuit 94 and null amplifier 108. Lead 90 is a short link between a first post of terminal posts 28 and one end of resistance element 56, shown attached to pin 30. Lead 91 connects the same end of the resistance element to bridge circuit 94. Lead 92 connects the other end of the resistance element, shown attached to pin 34, to the bridge. Lead 93 connects a second post of terminal posts 28 to a first input terminal on low level D.C. null amplifier 108. Lead 95 connects the bridge to a second input terminal on the null amplifier. A reference environment such as an ice bath 96 at 0° C. is provided for the thermocouple. Bridge circuit 94 comprises constant voltage supply 98 and resistors 102, 104, and 106. Null amplifier 108 is connected to the bridge circuit to indicate balance.

*Operation of the cold junction*

The cold junction is intended to operate in an unstable environment at ambient temperature between 70° and 115° F., for example, while providing the same stable characteristics as prior art junctions operating in a constant thermal environment.

The resistance element, in close thermal contact with and encased within a metal block, behaves as a resistance thermometer and provides a predictable change in resistance with changes in temperature, creating a voltage drop across the resistance element which is one arm of the bridge, thus compensating for a voltage change produced by a thermo-electric effect at the junction of the thermocouple leads and terminal posts.

The purpose of the massive metal block and posts is to provide a sufficiently large heat sink for maintaining the entire assembly at a uniform, although not necessarily constant, temperature despite changes in ambient temperature.

A metal bobbin is chosen so that the resistance element wound thereon may be kept as close as possible to the block temperature in order to provide the needed compensation. Further, the bobbin is chosen to be of the same material as the resistance element so that their coefficients of thermal expansion will match, reducing the chances of change in resistance by wire stretching and deformation. When the resistance element is wound, its resistance is made of a value such that further adjustment will always require trimming rather than adding length to the winding. During circuit calibration, the winding is trimmed to the precise value required for balancing the bridge circuit. This is done by connecting the resistance element to a Wheatstone bridge by suitable lead wires, raising the temperature of the cold junction to a value between 70° and 115° F., alternately trimming and connecting together a pair of ends of the bifilarly wound element, until the null amplifier reads zero, indicating bridge balance. This operation is performed while a standard thermocouple, such as one certified by the National Bureau of Standards, is immersed in a reference environment such as an ice bath at 0° C., for example.

Calibration insures that the voltage produced by the cold junction at normal operating temperature is equivalent to that produced by the standard thermocouple at 0° C., causing the null amplifier to read zero.

In a typical example the present invention comprises a thick rectangular block of anodized aluminum having a centrally located cylindrical cavity to accommodate a copper bobbin and a resistance element. Said bobbin is tightly fastened to the aluminum block by a brass screw. Said resistance element consists of approximately fifty turns of 39 gauge, insulated copper magnet wire, bifilarly wound on the bobbin and permanently attached thereto, resulting in a resistance of slightly greater than 10 ohms. The winding has a starting pair of ends and a finishing pair of ends. A hole is provided on each side of the central cavity to carry a tight fitting, gold plated brass post with threaded ends and a hexagonal shoulder portion. A thin cover plate made of plastic impregnated glass fiber carries three brass pins, supported by a thin copper sheet of substantial area surrounding each pin on the surface of the plate which fits adjacent the block. Two of the pins are connected by a common support.

Each of two separate pins carries one end of the starting pair of the bifilar winding. In the center of the pin cluster is a small hole through which is passed the pair of finish ends of the bifilar winding. The cover plate is attached to the aluminum block by speed nuts which thread over the brass posts and cooperate with the shoulder portions thereof to tightly clamp the cover to the block. An enclosing case of plastic, separable into two portions, surrounds the block. One portion of the case, provided with a hold to accommodate passage of the brass cover plate pins, is provided with holes to fit over the brass posts. "Keps" nuts fasten this portion to the block. The other portion is cemented to the first portion by means of an epoxy adhesive applied to the mating surfaces of the case flanges.

Brass knurled nuts and screw lugs provide securing means for attachment of thermocouple leads.

For calibration, a platinum and platinum with 10% rhodium thermocouple is placed in an icebath at 0° C. Resistors 102, 104 and 106 have values of 50.6K, 249.3K and 400 ohms, respectively. The constant voltage supply delivers 9 volts. Copper connecting leads, selected to be of the same length as will be ultimately used with the cold junction, are used to interconnect the bridge circuit, the resistance element, the terminal posts and the null amplifier.

It has been found that, between 70° F. and 115° F., the cold junction described in the typical example will produce a stable reference voltage which departs only 1.2 microvolts, maximum, from the voltage produced by a standard platinum and platinum with 10% rhodium thermocouple in an icebath at 0° C. It has also been found that an output voltage reproducibility of one microvolt or less is obtainable over a series of measurements.

Although the present invention has been described with respect to specific details of certain embodiments thereof, it is not intended that such details be limitations upon the scope of the invention except insofar as set forth in the following claims.

I claim:

1. A cold junction comprising a resistance element, a block of thermally conductive and electrically insulative material having a first pair of spaced apertures extending from one surface to the opposite surface thereof and a cavity suitable for closely accommodating said resistance element having an opening in said one surface, said resistance element being fixedly mounted within said cavity, an electrically insulative cover disposed adjacent said one surface over said cavity having a second pair of apertures in register with said first pair of apertures, resistance element terminal means fixedly attached to said cover extending from within said cavity to the exterior of said cover, said resistance element being connected to said terminal means, and terminal posts disposed within said first and second apertures extending therethrough fixedly attached to said block and cover, said terminal posts constituting a thermoelectric junction which produces a voltage in response to changes of ambient temperature, said resistance element being adapted to provide a second voltage in opposition to said first voltage, in response to said changes of ambient temperature, thereby compensating for such changes.

2. The cold junction of claim 1 wherein said block is formed of anodized aluminum.

3. The cold junction of claim 2 wherein said resistance element comprises a wire bifilarly wound upon a bobbin.

4. The cold junction of claim 3 wherein said wire and bobbin are formed of copper.

5. A cold junction comprising a bifilarly wound wire resistance element, a block of thermally conductive and electrically insulative material having a first pair of spaced apertures extending from one surface to the opposite surface thereof and a cavity suitable for accommodating said resistance element having an opening in said one surface, said resistance element being fixedly mounted within said cavity, an electrically insulative cover disposed adjacent said one surface over said cavity having a second pair of apertures in register with said first pair of apertures, resistance element terminal means embedded within said cover extending from within said cavity to the exterior of said cover, said resistance element being connected to said terminal means, terminal posts disposed within said first and second apertures extending therethrough fixedly attached to said block and cover, said terminal posts constituting a thermoelectric junction which produces a voltage in response to changes of ambient temperature, said resistance element being adapted to provide a second, counter voltage opposing said first voltage, in response to said changes of ambient temperature thereby eliminating the effect of said changes between 70° and 115° F., and an electrically and thermally insulative enclosure surrounding said block, said terminal means and said terminal posts extending beyond said enclosure.

References Cited by the Examiner

UNITED STATES PATENTS

| | | | |
|---|---|---|---|
| 1,426,861 | 8/1922 | Haddock | 73—359 XR |
| 2,475,238 | 7/1949 | Hall et al. | 73—361 |
| 2,562,538 | 7/1951 | Dyer | 73—355 |
| 2,836,639 | 5/1958 | Templin | 73—361 XR |
| 3,069,909 | 12/1962 | Hines | 73—361 |

DAVID SCHONBERG, *Primary Examiner.*

LOUIS R. PRINCE, *Examiner.*